(12) United States Patent
De Meersman (10) Patent No.: US 9,291,733 B2
(45) Date of Patent: Mar. 22, 2016

(54) DEVICE AND METHOD FOR DETERMINING S-WAVE ATTENUATION IN NEAR-SURFACE CONDITION

(75) Inventor: Kristof De Meersman, Calgary (CA)

(73) Assignee: CGGVERITAS SERVICES SA, Massy (FR)

( * ) Notice: Subject to any disclaimer, the term of this patent is extended or adjusted under 35 U.S.C. 154(b) by 913 days.

(21) Appl. No.: 13/353,587

(22) Filed: Jan. 19, 2012

(65) Prior Publication Data

US 2012/0195164 A1 Aug. 2, 2012

Related U.S. Application Data

(60) Provisional application No. 61/437,904, filed on Jan. 31, 2011.

(51) Int. Cl.
  *G01V 1/36* (2006.01)
  *G01V 1/28* (2006.01)

(52) U.S. Cl.
  CPC .............. *G01V 1/28* (2013.01); *G01V 2210/56* (2013.01); *G01V 2210/612* (2013.01)

(58) Field of Classification Search
  CPC ............ G01V 1/28; G01V 1/30; G01V 1/34; G01V 1/36; G01V 1/38; G01V 1/364; G01V 1/24; G01V 1/284; G01V 1/005; G06F 19/00
  USPC ............. 367/7, 24–25, 31, 40, 43, 45–47, 57, 367/59, 61, 63, 68, 73, 75, 79; 702/14, 702/16–18
  See application file for complete search history.

(56) References Cited

U.S. PATENT DOCUMENTS

| | | | |
|---|---|---|---|
| 4,353,121 A | 10/1982 | Ray et al. | |
| 4,648,039 A * | 3/1987 | Devaney et al. | 702/17 |
| 4,847,813 A * | 7/1989 | Alam et al. | 367/57 |
| 6,028,821 A * | 2/2000 | Boelle | 367/40 |
| 6,873,913 B2 * | 3/2005 | Choo et al. | 702/17 |
| 2003/0174581 A1* | 9/2003 | Parra et al. | 367/56 |
| 2006/0291328 A1* | 12/2006 | Robertsson et al. | 367/24 |
| 2008/0316860 A1* | 12/2008 | Muyzert et al. | 367/25 |
| 2011/0288831 A1* | 11/2011 | Tan et al. | 703/2 |
| 2012/0116682 A1* | 5/2012 | Saenger | 702/16 |

FOREIGN PATENT DOCUMENTS

GB 2381314 A 4/2003

OTHER PUBLICATIONS

Great Britain Search Report in corresponding Application No. GB1201599.6 mailed Apr. 30, 2012.

* cited by examiner

*Primary Examiner* — Luke Ratcliffe
*Assistant Examiner* — Amienatta M Ndure Jobe
(74) *Attorney, Agent, or Firm* — Patent Portfolio Builders PLLC (57) ABSTRACT

Computing device and method for determining primary and ghost components from S-waves recorded in near-surface conditions, wherein the S-waves are refracted or reflected from a structure in a subsurface. The method includes a step of receiving seismic data (R, V) with regard to the S-waves, wherein the seismic data includes vertical and radial components recorded with a buried three-component receiver; a step of calculating with a processor a primary component (P) and a ghost component (G) from the vertical and radial components; and a step of computing an image of a subsurface based on the primary and ghost components (P, G). The S-waves form a plane wave.

20 Claims, 10 Drawing Sheets

DEVICE AND METHOD FOR DETERMINING S-WAVE ATTENUATION IN NEAR-SURFACE CONDITION

CROSS REFERENCE TO RELATED APPLICATIONS

This application claims priority and benefit from Provisional Patent Application No. 61/437,904, filed Jan. 31, 2011, for "Determining S-Wave Attenuation in Near Surface," the entire contents of which are incorporated herein by reference.

BACKGROUND

1. Technical Field

Embodiments of the subject matter disclosed herein generally relate to methods and systems and, more particularly, to mechanisms and techniques for determining a Q-factor of S-waves near a surface of the earth.

2. Discussion of the Background

During the past years, interest in monitoring oil and/or gas reserves has increased, Time-lapse (or 4D) seismic monitoring of producing oil fields is an accepted method for optimization of field development and product recovery, providing significant improvements in recovery rates and savings in drilling costs.

Figure 1:
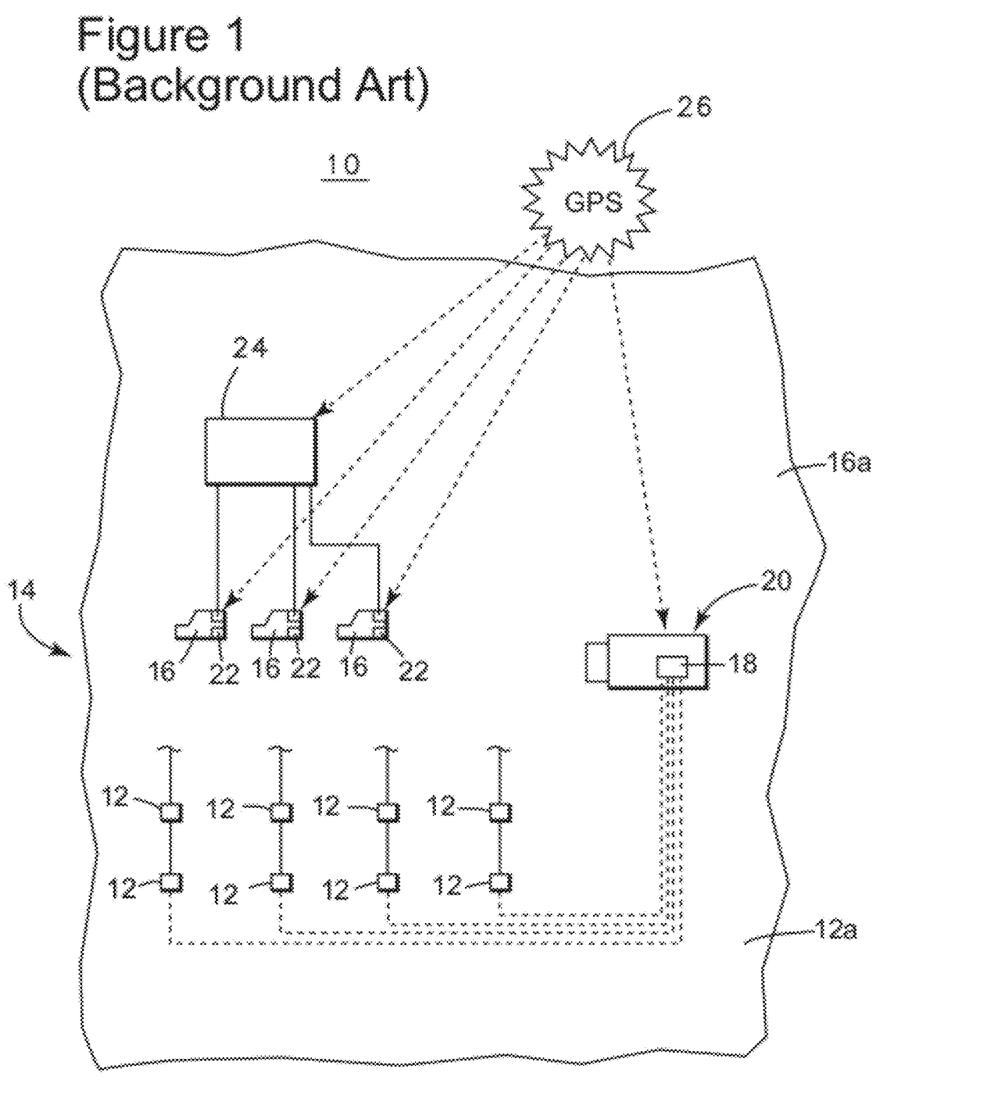
FIG. 1 is a schematic diagram of a conventional onshore seismic data acquisition system.

Time-lapse seismic reservoir monitoring is the comparison of 3D seismic surveys at two or more points in time. Time-lapse seismic reservoir monitoring also has potential for increasing ability to image fluid movement between wells. A traditional configuration for achieving a 4D seismic monitoring is illustrated in FIG. 1. FIG. 1 shows a system 10 for the acquisition of seismic data. The system 10 includes plural receivers 12 positioned over an area 12a of a subsurface to be explored and in contact with the surface 14 of the ground. A number of vibroseismic sources 16 are also placed on the surface 14 in an area 16a, in a vicinity of the area 12a of the receivers 12. A recording device 18 is connected to the plurality of receivers 12 and placed, for example, in a station-truck 20. Each source 16 may be composed of a variable number of vibrators, typically between 1 and 5, and may include a local controller 22. A central controller 24 may be present to coordinate the shooting times of the sources 16. A GPS system 26 may be used to time-correlate the sources 16 and the receivers 12.

With this configuration, sources 16 are controlled to generate seismic waves, and the plurality of receivers 12 record waves reflected by the oil and/or gas reservoirs and other structures. The seismic survey may be repeated at various time intervals, e.g., months or years apart, to determine changes in the reservoirs. Although repeatability of source and receiver locations is generally easier to achieve onshore, the variations caused by changes in near-surface can be significantly larger than reservoir fluid displacement, making time-lapse 4D seismic acquisition and repeatability challenging. Thus, variations in seismic velocity in the near-surface are a factor that impacts repeatability of 4D surveys. A secondary effect is the Q-factor. Thus, knowing the Q-factor helps in determining these changes in the near-surface.

As operators move to understand the behavior of the reservoir over time, particularly as it applies to mapping the migration paths of hydrocarbons and improving the performance of the reservoir under certain stimulation, 4D reservoir monitoring becomes increasingly more important for overall field development. However, to improve the calculations indicating the behavior of the reservoir based on 4D data, being able to accurately estimate the Q-factor is desirable.

Thus, there is a need for developing a device and a method for better estimating the effect the near-surface is having on the seismic waves (e.g., Q-factor) for improving the 4D calculations.

SUMMARY

According to one exemplary embodiment, there is a method for determining primary and ghost components from S-waves recorded in near-surface conditions. The method includes receiving seismic data (R, V) with regard to the S-waves, wherein the seismic data includes vertical and radial components recorded with a buried three-component receiver (106); calculating with a processor (1002) a primary component (P) and a ghost component (G) from the vertical and radial components; and computing an image of a subsurface based on the primary and ghost components (P, G). The S-waves form a plane wave.

According to another exemplary embodiment, there is a computing device for determining primary and ghost components from S-waves recorded in near-surface conditions. The computing device includes an interface configured to receive seismic data with regard to the S-waves, wherein the seismic data includes vertical and radial components recorded with a buried three-component receiver; and a processor connected to the interface. The processor is configured to calculate a primary component and a ghost component from the vertical and radial components; and compute an image of a subsurface based on the primary and ghost components. The S-waves form a plane wave.

According to still another exemplary embodiment, there is a method for determining primary and ghost components from S-waves recorded in near-surface conditions. The method includes receiving seismic data with regard to the S-waves, wherein the seismic data includes vertical and radial components recorded with a buried three-component receiver; calculating with a processor a primary component and a ghost component from the vertical and radial components; and computing an image of a subsurface based on the primary and ghost components. The S-waves form a plane wave, and the near-surface conditions describe a part of the subsurface between the buried three-dimensional receiver and a surface of the earth.

According to yet another exemplary embodiment, there is a computer readable medium including computer executable instructions, wherein the instructions, when executed by a processor, implement a method for determining primary and ghost components from S-waves recorded in near-surface conditions as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic system having a dipole source and buried three-dimensional receivers. However, the embodiments to be discussed next are not limited to a dipole source and may be applied to other types of sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for separating primary and ghost components. The method includes a step of receiving seismic data recorded with buried three-dimensional receivers. The seismic data includes both radial and vertical components. The method includes a step of transforming the radial and vertical components into primary and ghost components (or energy). Optionally, based on the primary and ghost components, a modified log-spectral algorithm is employed to determine a Q-factor near-surface. The speed of the S-waves in the near-surface is determined by measuring time differences between the primary and ghost wave fields and geometric considerations associated with the S-waves, as discussed later. Refracted and/or reflected waves may be used for this determination.

Figure 2:
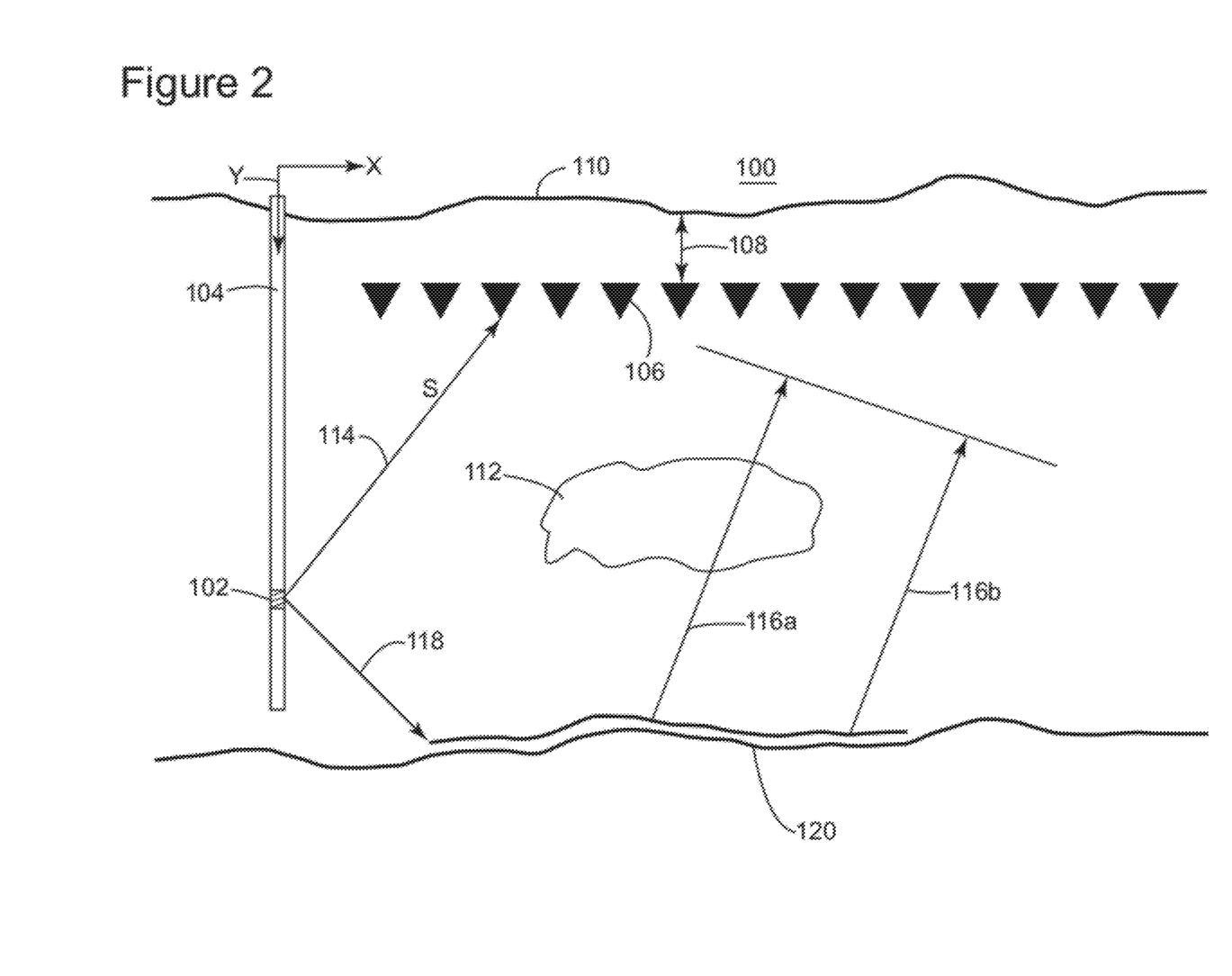
FIG. 2 is a schematic diagram of an onshore seismic data acquisition system according to an exemplary embodiment.

According to an exemplary embodiment illustrated in FIG. 2, a seismic system 100 includes at least a seismic source 102 that might be provided in a well 104. The source may be any known source. For example, the source may be a SeisMovie source (developed by CGGVeritas, France) that includes piezoelectric vibrator elements that provide a wide bandwidth and high reliability/repeatability. A plurality of receivers 106 are buried at a predetermined depth 108 relative to a surface of the earth 110. The predetermined depth may be a distance larger than zero and smaller than the depth of the reservoir. In one exemplary embodiment, the predetermined depth is 12 m. The receivers may be three-component (3C) geophones or 4C, i.e., a 3C geophone and a hydrophone. However, other three-component receivers may be used. The reservoir or subsurface 112 to be monitored needs to be located at a depth larger than the depth of the receivers 106.

In an exemplary embodiment, the system 100 includes hundreds (e.g., 480) of 3C receivers buried at about 12 m and tens (e.g., 11) of sources configured to continuously emitting seismic waves. The sources may be provided in the well (or multiple wells) at a depth of about 80 m. The data may be recorded for tens of days, for example, 80 days. The data may be averaged to produce a single set. The data may be used to show that the acquisition system 100 and survey design are ideally suited to obtain estimates of S-wave attenuation for the top soil with high spatial resolution. The top soil (near-surface) is considered to be that portion of the ground that is above the receivers 106. This top soil is sometimes called the weathering layer.

As low S-wave velocities (large statics) and high absorption rates (low Q) within the weathering layer are considered to be among the main causes for reduced bandwidth and signal-to-noise of converted-wave (PS) data when compared to conventional P-wave (PP) data, an exemplary embodiment to be discussed next determines the primary and ghost components from measured vertical and radial components of the S-waves. As an extension to this embodiment, it is possible to also determine the Q-factor for the weathering layer using a novel algorithm that is based on the primary and ghost components. This algorithm may lead to more deterministic approaches for dealing with near-surface corrections in converted-wave processing.

One of the quantities needed to calculate the Q-factor is the speed of the S-waves in the near-surface. This speed, as discussed later in more detail, may be estimated from recording refracted S-waves. FIG. 2 shows a direct S-wave 114, i.e., a wave that propagates from the source 102 directly to the receivers 106. FIG. 2 also shows refracted S-waves 116*a* and 116*b*. The refracted S-waves 116*a-b* are a result of a down-going S-wave 118 that reaches a critical angle and gets refracted from a structure 120. It is noted that the direct S-wave 114 is recorded with a small offset (i.e., distance from the source to the receiver along X axis is small) while the refracted S-waves 116*a-b* are recorded with medium to large offsets.

To summarize, the novel algorithm for measuring near-surface attenuation uses buried 3C receivers that measure the wave field at two instances. Any seismic energy that is reflected, refracted or generated at a depth below the buried receiver array is recorded first as it passes through the plurality of receivers while propagating toward the earth's surface. This up-going primary energy is then reflected down at the free surface (it is assumed that the reflection coefficient of the free surface is −1) and recorded a second time as it propagates back down into the earth. This later, secondary arrival includes down-going, or ghost, energy. Thus, based on this information, it is possible to estimate an effective measure of the Q-factor for the weathering layer, between the surface and the buried receivers, by applying the log-spectral ratio method on the primary and ghost wave fields. Before the Q-factor can be estimated it is, however, necessary to understand the nature and kinematics of the recorded S-waves, as well as develop a novel method for separating them into their up-going and down-going parts. These aspects are discussed next.

Figure 3:
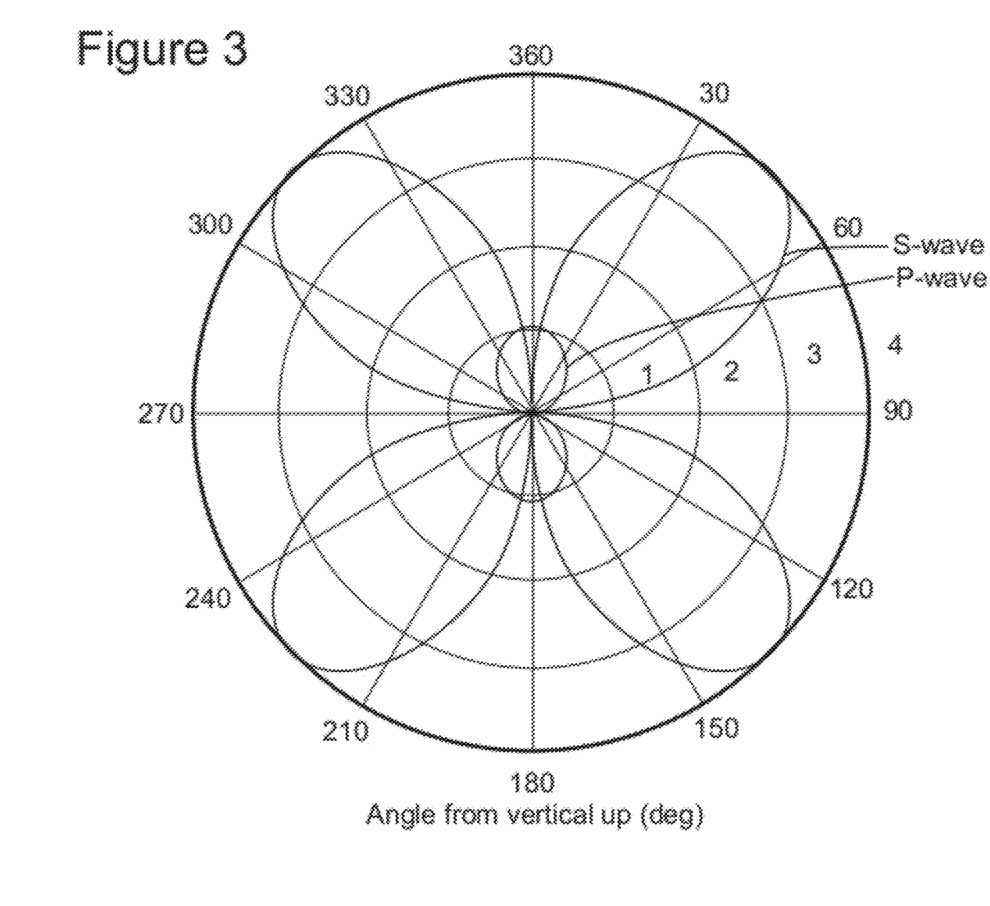
FIG. 3 is a schematic diagram indicating waves generated by a seismic source.

A possible seismic source to be used to generate the seismic waves in FIG. 2 may be a dipole with a long axis oriented along a vertical Y direction. Dipole sources are highly directional and emit both P-waves and S-waves as shown in FIG. 3. The radiation pattern is rotationally symmetric about the vertical axis. Maximum P-wave energy is emitted vertically while none is emitted horizontally. Maximum S-wave energy is emitted at a 45° angle from vertical in both the upward and downward directions. No S-wave energy is emitted vertically or horizontally. Only $S_V$ waves are generated and, overall, more S-wave energy is generated than P-wave energy. Upward- and downward-emitted energies have opposite polarities.

Figure 4A:
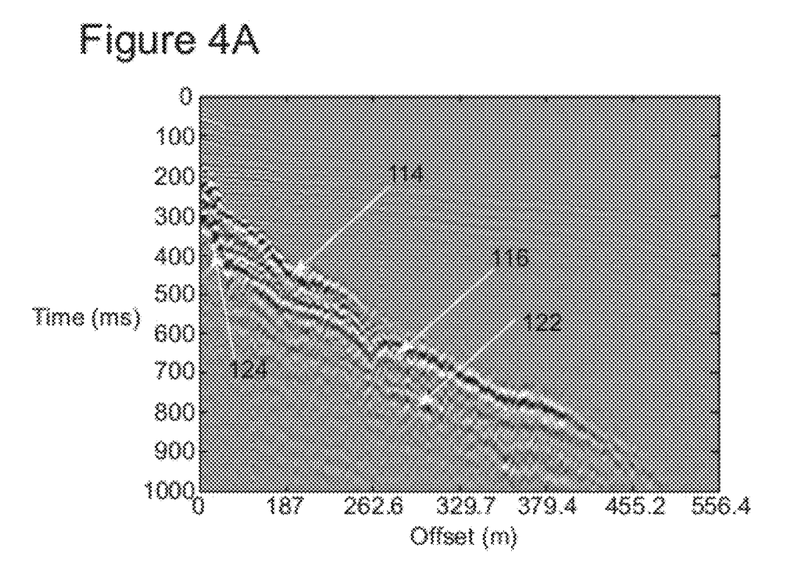
FIGS. 4A and 4B illustrate vertical and radial components of recorded data according to an exemplary embodiment.
Figure 4B:
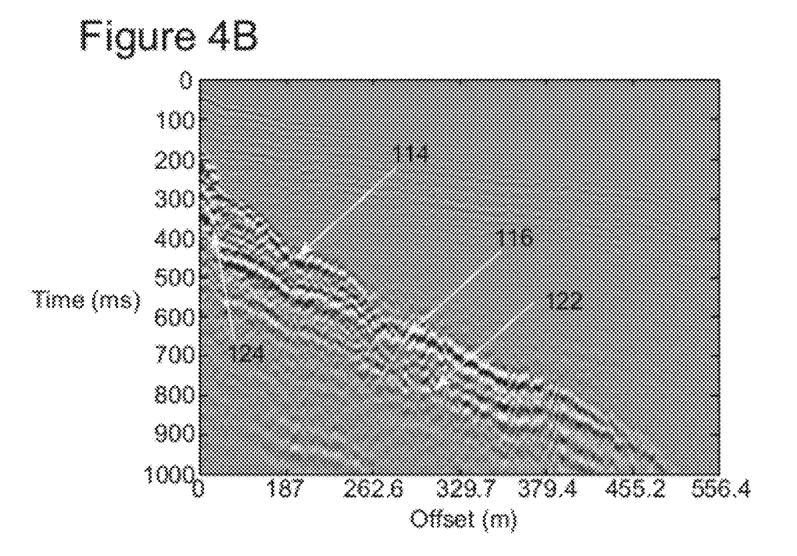

Representative vertical and radial component shot gathers calculated based on the data recorded by the receivers 106 and illustrated in FIGS. 4A and 4B show an abundance of coherent P-wave reflections as well as some coherent "first break" S-wave arrivals 114 and 116 that are followed mainly by incoherent or scattered S-wave noise. The lack of clear and abundant S-wave reflections is a consequence of the absence of vertically emitted S-waves in the source radiation pattern. The coherent first break S-wave event consists of two distinct arrivals. The first is the direct arrival from upward-emitted S-waves 114. The second one corresponds to the refracted S-waves 116a-b. The second arrival is due to the structure of the sources that emit most S-wave energy at 45°. Thus, it is expected that a large portion of the downward-emitted energy will reach critical angles at relatively limited offset and depth from the source. A structure 120 located below the sources is the possible candidate for producing the refraction S-waves 116a-b. FIGS. 4A and 4B also show the refracted ghost 122 and the direct ghost 124.

Figure 5:
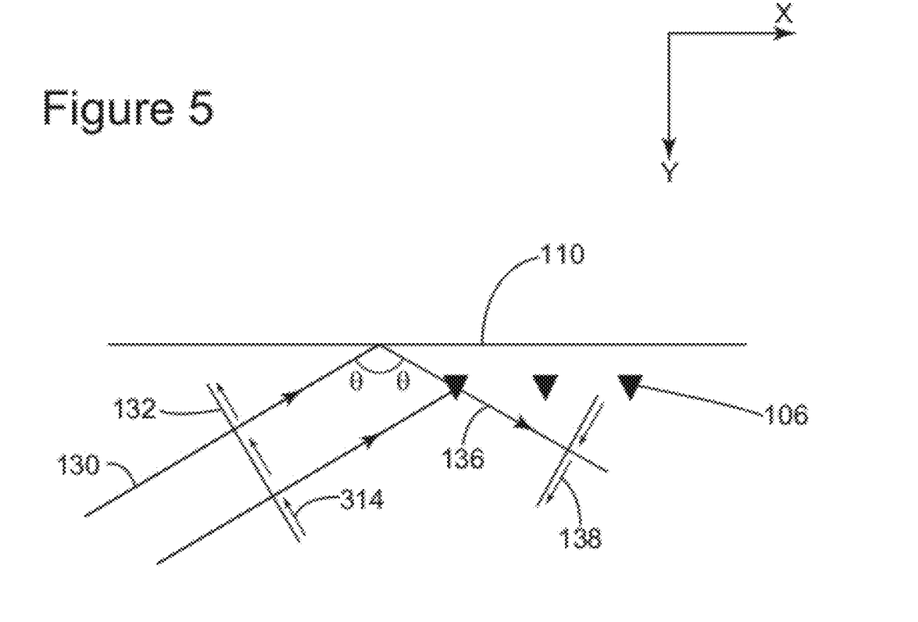
FIG. 5 is a schematic diagram illustrating up-going (primary) and down-going (ghost) S-waves and their polarizations according to an exemplary embodiment.
Figure 6:
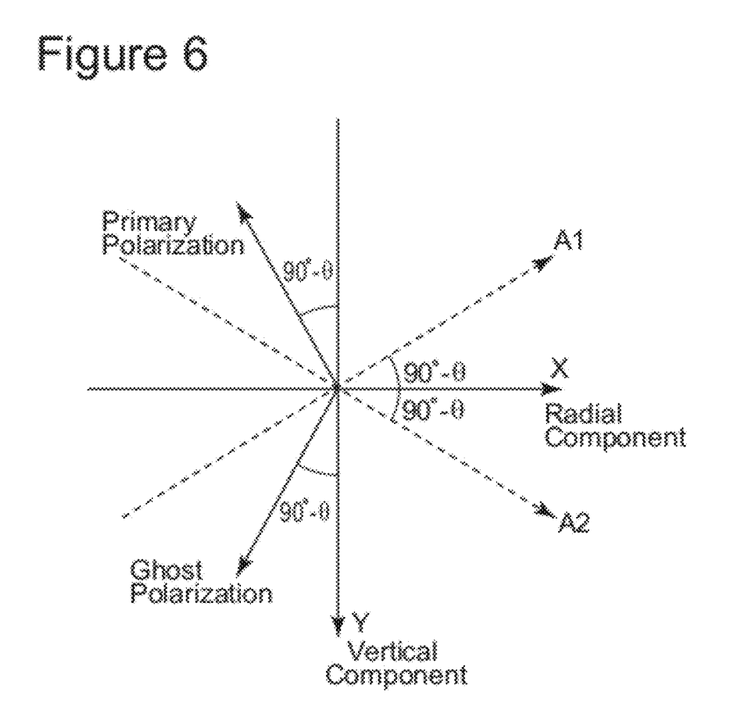
FIG. 6 is a schematic diagram illustrating primary and ghost components according to an exemplary embodiment.

Having recorded the refracted S-waves (radial and vertical components) with the 3C receivers, the radial and vertical recorded components may be used to calculate primary and ghost components as discussed next. FIG. 5 illustrates refracted S-waves 130 having a wavefront 132 (plane waves) and a polarization 134 along the wavefront 132. After reflection with angle θ on the surface 110, the ghost S-waves 136 have polarization 138. FIG. 6 shows a relationship between the primary (130) and ghost (136) polarizations, relative to the X and Y axes, that correspond to the radial and vertical components, respectively.

One useful property regarding refractions in general is that they reach the receivers at a common propagation angle (i.e., as a plane wave as shown in FIG. 2). This is true for receivers that are at a common depth 108 within a 1D velocity structure. In the following, it is assumed that the bulk of the refracted energy is explained in terms of a single refracting layer 120 and, hence, a single, unique ray angle at the recording level. Under these circumstances, the recorded S-wave refraction energy on the vertical (V) and radial (R) components of the buried receivers may be written in terms of a primary energy (P), a ghost energy (G) and a ray angle θ (that is measured from vertical) as:

$$\begin{bmatrix} V \\ R \end{bmatrix} = \begin{bmatrix} -\sin(\theta) & \sin(\theta) \\ -\cos(\theta) & -\cos(\theta) \end{bmatrix} \begin{bmatrix} P \\ G \end{bmatrix} \Leftrightarrow d = Am. \quad (1)$$

Equation (1) relates to a coordinate system where the vertical axis points down and the radial direction points away from the source as shown in FIG. 6. Up-down separation of the refracted S-waves can be achieved by inverting the A-matrix, yielding the true-amplitude expressions for the up-going and down-going refracted S-waves. This is expressed as:

$$\begin{bmatrix} P \\ G \end{bmatrix} = \frac{1}{\sin(2\theta)} \begin{bmatrix} -\cos(\theta) & -\sin(\theta) \\ \cos(\theta) & -\sin(\theta) \end{bmatrix} \begin{bmatrix} V \\ R \end{bmatrix}, \quad (2)$$

where the term $1/\sin(2\theta)$ is a scaling factor. The P and G components may be separated by using axes A1 and A2 shown in FIG. 6. It is noted that a projection of the P and G components on axis A1 has no primary energy, only ghost energy, and the opposite is true for the axis A2. The projection of the P and G components on axis A1 is given by:

$$A1_{component} = \frac{1}{\sin(2\theta)}(-V\cos(\theta) - R\sin(\theta)), \quad (3)$$

and the projection of the P and G components on axis A2 is given by:

$$A2_{component} = \frac{1}{\sin(2\theta)}(V\cos(\theta) - R\sin(\theta)). \quad (4)$$

These projections point in a general direction that is opposite than that of the radial component R. This will cause a polarity reversal between the estimates of P and G and the data originally recorded on the radial component R. To correct for this we can multiply (3) and (4) by −1 and obtain $$A1_{component} = \frac{1}{\sin(2\theta)}(V\cos(\theta) + R\sin(\theta)), \text{ and} \quad (3')$$

$$A2_{component} = \frac{1}{\sin(2\theta)}(-V\cos(\theta) + R\sin(\theta)). \quad (4')$$

A grid search is performed over ray angles θ to find a direction for which optimal separation into up- and down-going energy can be achieved. This step results in the θ angle being around 30°. It is noted that this angle may change as the algorithm is applied to another subsurface. Thus, this novel method uses measurements obtained from buried receivers to separate and estimate the primary and ghost components. Having the primary and ghost components, it is possible to calculate the Q-factor as discussed next. However, it is noted that based on the primary and ghost components it is possible to calculate other things, e.g., an image of the surveyed subsurface, a velocity model of the subsurface, etc. Further, it is noted that an advantage of this method of separating the primary and ghost components based on land seismic data recorded with underground receivers is related to the time-lapse benefits, i.e., the up-going (primary) wave field is not affected by time-lapse changes in the near-surface as this signal is recorded by the buried receivers, which may be below the weather layer. Therefore, any time-lapse change that is measured from the up-going wave fields can be attributed to deeper layers and not to the near-surface. This is one advantage over conventional time-lapse acquisitions with receivers on the surface.

One application of the calculated primary and ghost components is now discussed with regard to the Q-factor. For determining a value of the Q-factor, the log-spectral ratio algorithm may be used as discussed next. Other methods known in the art may be used. The log-spectral ratio algorithm relies on the amplitudes of a seismic wave at two points along its propagation path. In other words, considering that the Q-factor is given by:

$$Q = \frac{\pi f r}{V_S \ln\left(\frac{A_0}{A}\right)} = \frac{\pi r}{V_S \gamma}, \quad (5)$$

one would need to know $A_0$, A, $V_s$, f, and r in order to determine the Q-factor. It is noted that a bold letter indicates a matrix or a vector.

Here, $A_0$ corresponds to an up-going S-wave energy, A corresponds to a down-going energy, $V_s$ is the near-surface speed of the S-wave, r is a distance to be defined next, and γ is a gradient of the log-spectral ratio between the primary and ghost S-waves.

Figure 7:
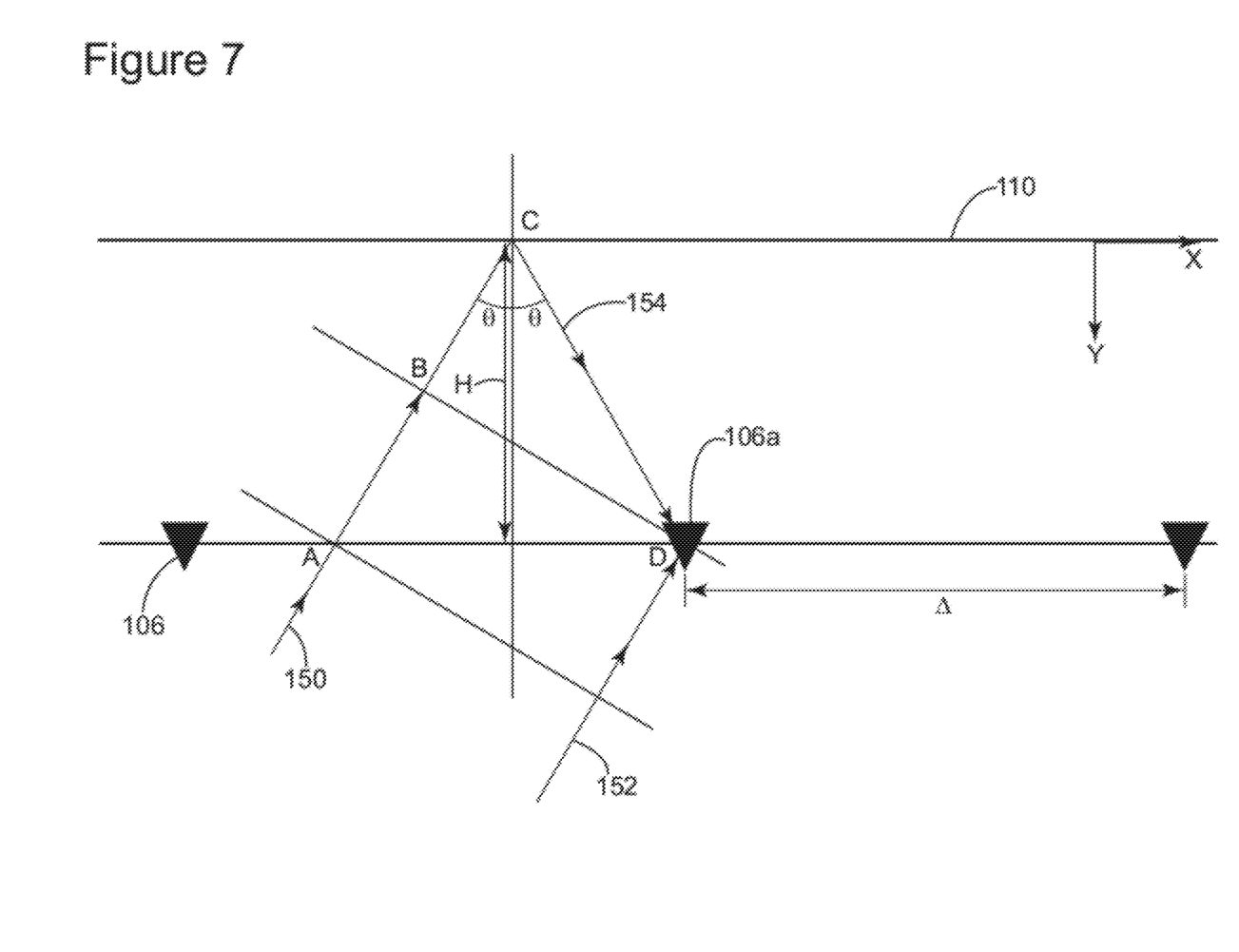
FIG. 7 is a schematic diagram illustrating two refracted S-waves and their geometrical relationships according to an exemplary embodiment.

The near-surface speed $V_s$ and the distance r are now calculated for the configuration illustrated in FIG. 7. Consider two rays 150 and 152 of a refracted S-wave that propagates (up-going waves) toward receivers 106. The receivers are separated along axis X by a distance Δ, e.g., 14 m. Assume that the refracted S-wave 152 is recorded by the receiver 106a while the refracted S-wave 150 is not (more precisely reference numbers 150 and 152 denote rays and not waves). When the up-going S-wave 150 arrives at the surface 110, it gets reflected and becomes down-going S-wave 154. The S-wave 154 (the ghost) is recorded by the receiver 106a later in time than the S-wave 152. The S-waves 150, 152 and 154 are illustrated in FIG. 7 associated with points A, B, C and D. Point A corresponds to the "intersection" of the S-wave 150 with an imaginary line extending through the receivers 106, point B corresponds to a wave front formed by S-waves 150 and 152 at a time when the S-wave 152 is recorded by the receiver 106a, C corresponds to the reflection point of the S-wave 150, and D corresponds to the location of receiver 106a. It is noted that the A in equation (5) is a matrix or a vector, while point A in FIG. 7 is a geometric point. Thus, these two symbols should not be confused herein.

Returning to equation (5), r is the distance traveled by the S-waves from A to B to C and D. The distance r may be calculated as twice the depth H divided by cos(θ). The depth H is known because the receivers are buried at this depth. Thus, r can be calculated.

The near-surface speed $V_s$ of the S-waves may be estimated by summing together the distances BC and CD (distance travelled by the S-wave 150) and dividing this sum by the total travel time Δt of the S-wave from B to C to D. In this calculation, it is assumed that the refracted S-waves 150 and 152 form a plane wave. In other words, as illustrated in FIG. 7, an amplitude of a first, refracted, up-going S-wave 150, at a point B between two consecutive, buried, three-dimensional receivers 106 and 106a, is the same with an amplitude of a second, refracted, up-going S-wave 152 that is recorded by one of the two consecutive, buried, three-dimensional receivers 106a. This assumption is true for refracted waves in near-surface condition. In other words, the near-surface speed becomes $$V_S = \frac{2*depth*\cos(\theta)}{\Delta t}.$$

The travel time Δt may be calculated by performing the cross-correlation of up-going and down-going S-waves recorded in a receiver at D. Thus, the near-surface speed $V_s$ may be calculated. In one exemplary embodiment, the near-surface speed is about 210 m/s.

Figure 8:
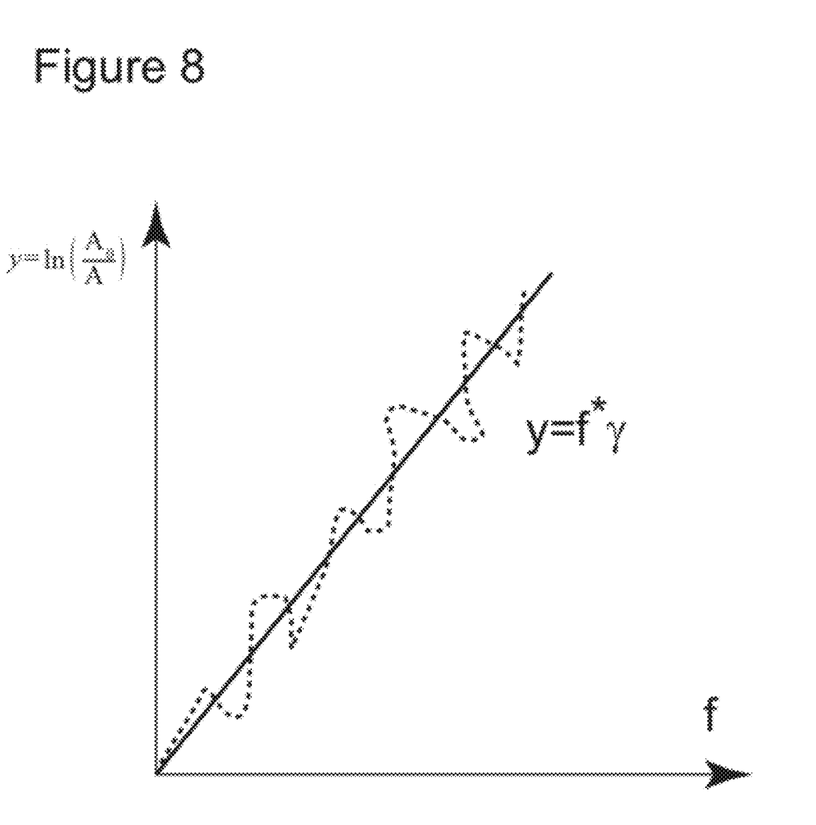
FIG. 8 is a graph illustrating how to determine a gradient according to an exemplary embodiment.

What is left is to calculate the gradient γ before being able to calculate the Q-factor. As illustrated in FIG. 8, the gradient γ is determined based on the ratio of the amplitude spectra $A_0$ and A for different frequencies, these amplitude spectra are calculated using the Fourier transforms of $A1_{component}$ and $A2_{component}$, respectively, from FIG. 6. As discussed above, the gradient of the log-spectral ratio between the primary and ghost S-waves is given by γ, and the arrival time difference between them is given by Δt. Both properties are measured at the same receiver. Ideally, one would compute the gradient γ of the log-spectral ratio between the up-going S-wave energy at A (in FIG. 7) and the down-going energy at D. These locations represent the same point on the wave front at different times. However, no receiver is located at A, but the distance between A and D is small, e.g., approximately 14 m. Therefore, the up-going amplitude at D can be used to substitute for that at A.

One advantage of taking ratios of spectra from the primary and ghost at the same receiver location is that this will yield Q-values that are not biased by coupling variations between the different receivers. However, this might come at a penalty of some limited spatial smearing. The γ-values may be obtained by L1-fitting a straight line through the origin for spectral ratio, therefore, assuming a free surface reflection coefficient of −1 and neglecting amplitude spreading effects within the top surface.

Figure 9:
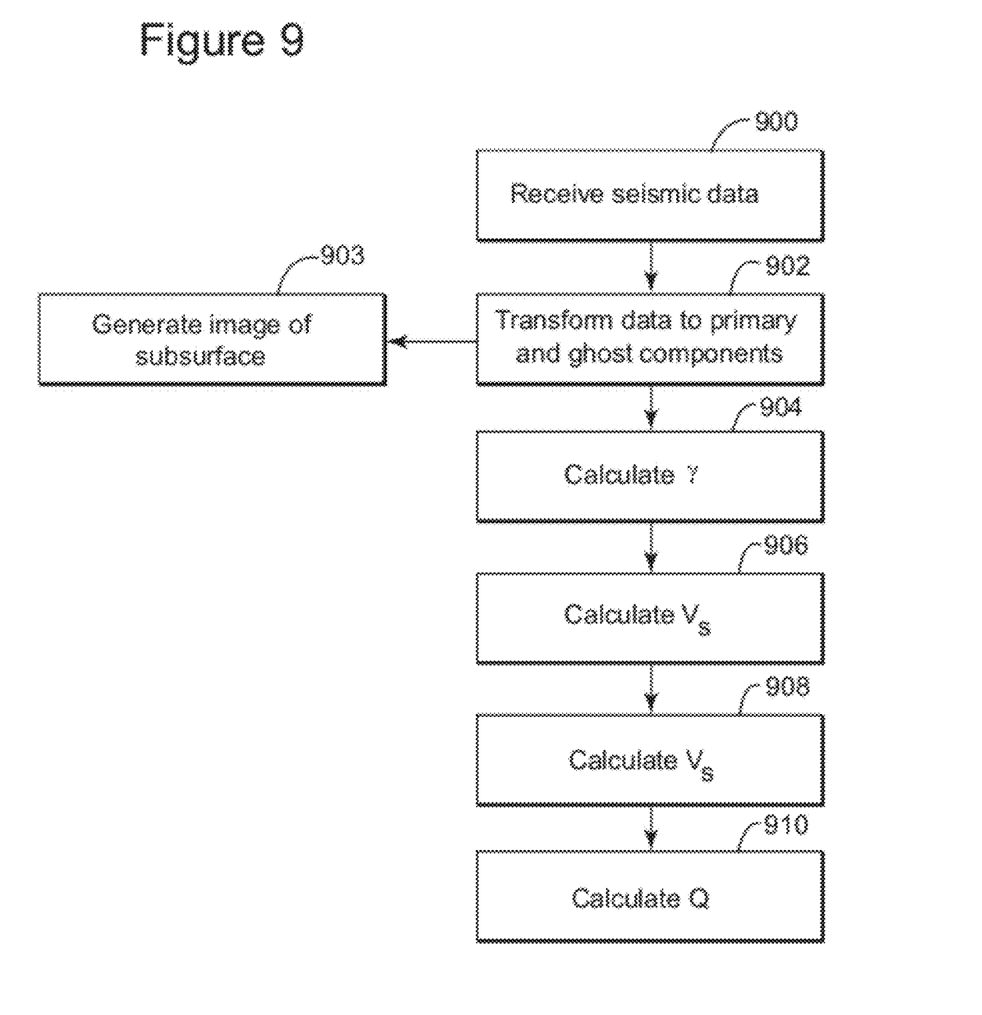
FIG. 9 is a flowchart illustrating a method for determining the Q-factor according to an exemplary embodiment.

Thus, having the necessary ingredients, i.e., $V_s$, r and γ, one could program, for example, a processor to calculate the Q-factor. A flowchart illustrating how to calculate the Q-factor is now discussed with regard to FIG. 9. In step 900, seismic data is received. The seismic data is recorded with buried 3C receivers. The data is processed in step 902 to transform it from radial and vertical components to primary and ghost components as discussed above with reference to FIGS. 5 and 6. The primary and ghost components are then used, for example, to generate in step 903 an image of the surveyed subsurface. Such a step may be implemented in a computing device. Optionally, the primary and ghost components are used in step 904 to determine the gradient γ of the ratio of the up- and down-going S-wave amplitudes versus frequency. In step 906, the near-surface speed of the S-waves is calculated based on refracted S-waves and the geometry of the arrangement. In step 908 a distance traveled by the up-going S-wave from an imaginary line going through the receivers up to the ground surface and back to the receivers is calculated. In step 910, the Q-factor is calculated based on the gradient γ of step 904, the near-surface speed calculated in step 906, and the traveled distance calculated in step 908.

One advantage of one or more of the exemplary embodiments discussed above is that the spectral ratio between up-going and down-going waves recorded at the same station makes coupling and geophone response corrections obsolete and relaxes constraints imposed by recording geometry.

Figure 10:
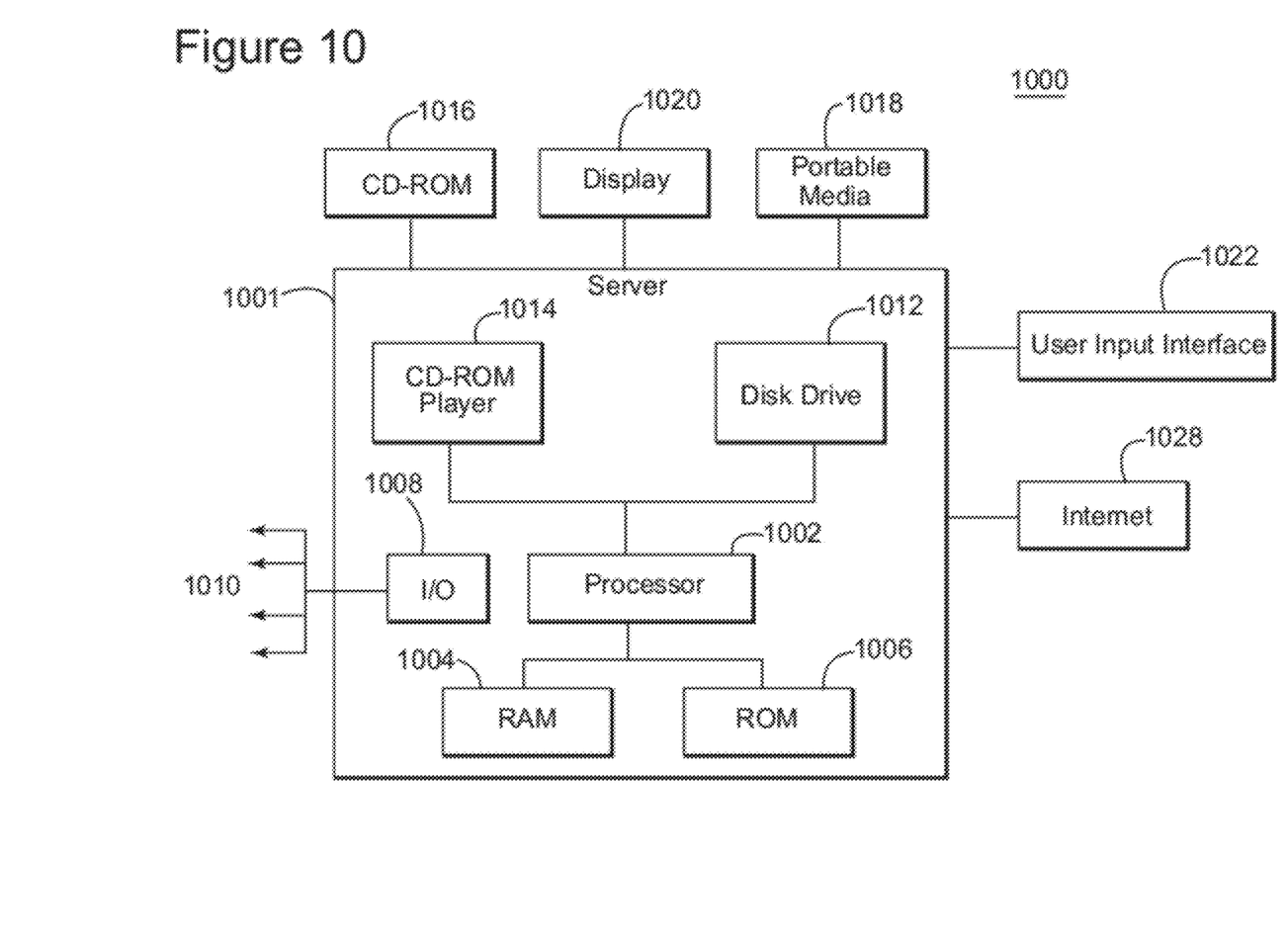
FIG. 10 is a schematic diagram of a computing device.

For purposes of illustration and not of limitation, an example of a representative computing device capable of carrying out calculations in accordance with the exemplary embodiments is illustrated in FIG. 10. Hardware, firmware, software or a combination thereof may be used to perform the various steps and operations described herein.

The exemplary computing device 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including hard and floppy disk drives 1012, CD-ROM drives 1014, and other hardware capable of reading and/or storing information such as DVD, etc. In one embodiment, software for carrying out the above-discussed steps may be stored and distributed on a CD-ROM 1016, portable media 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, LED displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as a landline and/or wireless terminals, via a network. The server may be part of a larger network configuration as in a global area network (GAN) such as the Internet 1028, which allows ultimate connection to the various landline and/or mobile client/watcher devices.

The disclosed exemplary embodiments provide a system and a method for calculating primary and ghost components based on seismic data recorded with buried seismic 3C recorders. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining primary and ghost components from S-waves recorded in near-surface conditions, the method comprising:
   receiving seismic data (R, V) with regard to the S-waves, wherein the seismic data includes vertical and radial components recorded with a buried three-component receiver;
   calculating with a processor a primary component (P) and a ghost component (G) from the vertical and radial components corresponding to the S-waves; and
   computing an image of a subsurface based on the primary and ghost components (P, G),
   wherein the S-waves form a plane wave.

2. The method of claim 1, wherein the near-surface conditions describe properties of the ground located above the buried three-dimensional receiver.

3. The method of claim 1, wherein the S-waves are refracted from a structure in the subsurface.

4. The method of claim 1, further comprising:
   computing a Q-factor of the S-waves in the near-surface by using a modified log-spectral ratio algorithm that relies on the primary and ghost components.

5. The method of claim 4, wherein the computing step further comprises:
   determining a gradient $\gamma$ of a log-spectral ratio between the primary and ghost components.

6. The method of claim 5, further comprising:
   plotting a logarithm of a ratio between the primary and ghost components versus a frequency of the components to determine the gradient $\gamma$.

7. The method of claim 5, further comprising:
   calculating a near-surface speed $V_s$ of the S-waves by,
   selecting two S-waves, a first S-wave that is recorded by the buried three-component receiver when the first S-wave propagates towards the surface of the earth, and a second S-wave that is recorded by the buried three-component receiver after the second S-wave has reflected from the surface of the earth and is traveling away from it,
   calculating a geometrical distance travelled by the second S-wave between a time when the first S-wave is recorded and a time when the second S-wave is recorded,
   cross-correlating data related to the first and second S-waves to determine a travel time, and
   dividing the geometrical distance by the travel time to determine the near-surface speed.

8. The method of claim 7, further comprising:
   calculating a distance r travelled by the second S-wave between (1) a point lying on an imaginary line that extends through buried three-dimensional receivers, wherein the imaginary line intersects with the second S-wave at the point, and (2) a position of the three-dimensional receiver that records the first S-wave.

9. The method of claim 8, further comprising:
   calculating the Q factor as a ratio of (i) r and (ii) the product of Vs and $\gamma$.

10. The method of claim 1, further comprising:
    considering that an amplitude of a first, refracted, up-going S-wave, at a point between two consecutive, buried, three-dimensional receivers, is the same as an amplitude of a second, refracted, up-going S-wave that is recorded by one of the two consecutive, buried, three-dimensional receivers.

11. A computing device for determining primary and ghost components from S-waves recorded in near-surface conditions, the computing device comprising:
    an interface configured to receive seismic data with regard to the S-waves, wherein the seismic data includes vertical and radial components recorded with a buried three-component receiver; and
    a processor connected to the interface and configured to,
    calculate a primary component and a ghost component from the vertical and radial components corresponding to the S-waves; and
    compute an image of a subsurface based on the primary and ghost components,
    wherein the S-waves form a plane wave.

12. The computing device of claim 11, wherein the near-surface conditions describe properties of the ground located above the buried three-dimensional receiver.

13. The computing device of claim 11, wherein the S-waves are refracted from a structure in the subsurface.

14. The computing device of claim 11, wherein the processor is further configured to:
compute a Q-factor of the S-waves in the near-surface by using a modified log-spectral ratio algorithm that relies on the primary and ghost components.

15. The computing device of claim 14, wherein the processor is further configured to:
determine a gradient γ of a log-spectral ratio between the primary and ghost components;
plot a logarithm of a ratio between the primary and ghost amplitude components versus a frequency of the components to determine the gradient γ;
calculate a near-surface speed $V_s$ of the S-waves by,
selecting two S-waves, a first S-wave that is recorded by the buried three-component receiver when the first S-wave propagates towards the surface of the earth, and a second S-wave that is recorded by the buried three-component receiver after the second S-wave has reflected from the surface of the earth and is traveling away from it,
calculating a geometrical distance travelled by the second S-wave after the first S-wave is recorded and before the second S-wave is reflected,
cross-correlating data related to the first and second S-waves to determine a travel time, and
dividing the geometrical distance by the travel time to determine the near-surface speed;
calculate a distance r travelled by the second S-wave between (1) a point lying on an imaginary line that extends through buried three-dimensional receivers, wherein the imaginary line intersects with the second S-wave at the point, and (2) a position of the three-dimensional receiver that records the first S-wave; and
calculate the Q factor as a ratio of (i) r and (ii) the product of Vs and γ.

16. The computing device of claim 15, wherein the processor is further configured to:
consider that an amplitude of a first up-going S-wave, at a point between two consecutive, buried, three-dimensional receivers, is the same with an amplitude of a second up-going S-wave that is recorded by one of the two consecutive, buried, three-dimensional receivers.

17. A method for determining primary and ghost components from S-waves recorded in near-surface conditions, the method comprising:
receiving seismic data with regard to the S-waves, wherein the seismic data includes vertical and radial components recorded with a buried three-component receiver;
calculating with a processor a primary component and a ghost component from the vertical and radial components corresponding to the S-waves; and
computing an image of a subsurface based on the primary and ghost components,
wherein the S-waves form a plane wave, and
the near-surface conditions describe a part of the subsurface between the buried three-dimensional receiver and a surface of the earth.

18. The method of claim 17, further comprising:
generating the S-waves with a source located below a reservoir of interest in the subsurface, part of the S-waves propagating downwards in the subsurface; and
refracting and not reflecting the S-waves propagating downwards in the subsurface to produce the recorded S-waves.

19. The method of claim 17, wherein the primary component P is given by $$P = \frac{1}{\sin(2\theta)}(V\cos(\theta) + R\sin(\theta))$$

and the ghost component G is given by $$G = \frac{1}{\sin(2\theta)}(-V\cos(\theta) + R\sin(\theta)),$$

where V is the vertical component, R is the radial component and θ is a propagation angle at the receiver.

20. A non-transitory computer readable medium including computer executable instructions, wherein the instructions, when executed by a processor, implement a method for determining primary and ghost components from S-waves recorded in near-surface conditions, the method comprising:
receiving seismic data (R, V) with regard to the S-waves, wherein the seismic data includes vertical and radial components recorded with a buried three-component receiver;
calculating with a processor a primary component (P) and a ghost component (G) from the vertical and radial components corresponding to the S-waves; and
computing an image of a subsurface based on the primary and ghost components (P, G),
wherein the S-waves form a plane wave.

* * * * *